Sept. 9, 1969  E. E. McCULLOUGH  3,465,388
COMBINED SEGMENTED MANDREL AND HANDLING MEANS THEREFOR
Filed Aug. 18, 1967  3 Sheets-Sheet 1

INVENTOR.
EDWARD E. McCULLOUGH
BY
AGENT

Sept. 9, 1969  E. E. McCULLOUGH  3,465,388
COMBINED SEGMENTED MANDREL AND HANDLING MEANS THEREFOR
Filed Aug. 18, 1967  3 Sheets-Sheet 2

INVENTOR.
EDWARD E. McCULLOUGH
BY
Thomas W. Branson
AGENT

United States Patent Office 3,465,388
Patented Sept. 9, 1969

3,465,388
COMBINED SEGMENTED MANDREL AND
HANDLING MEANS THEREFOR
Edward E. McCullough, Brigham City, Utah, assignor to Thiokol Chemical Corporation, Bristol, Pa., a corporation of Delaware
Continuation-in-part of application Ser. No. 428,466, Jan. 27, 1965. This application Aug. 18, 1967, Ser. No. 661,603
Int. Cl. B29c 1/06
U.S. Cl. 18—45    10 Claims

ABSTRACT OF THE DISCLOSURE

In a mandrel made of flexible, laminar segments arranged on a spindle for making cavities in hollow objects wherein access openings are smaller in diameter than the mandrel, the combination of a handling tool, or mechanism, wherein a pawl may be engaged and disengaged relative to mandrel segments for moving them along the spindle.

This invention relates to mandrels or molding pieces for making cavities in hollow objects wherein the access openings are smaller than the diameter of the mandrel. Particularly, it relates to segmented mandrels and handling tool or mechanism therefor, both of modified construction for mutually cooperative use.

This application in a continuation-in-part of the prior, copending application Ser. No. 428,466 filed Jan. 27, 1965, now Patent No. 3,345,693, and titled "Apparatus for Forming Ignition Surfaces of Solid Propellant Rocket Motor" and relates back to said application for all common subject matter.

The mandrels disclosed in the application for Letters Patent cited above have been found useful in precision forming of combustion chambers in solid-propellant rockets, especially wherein such chambers are of "star" cross-sectional configuration and the access opening for the mandrel is smaller than the diameter of the mandrel. However, there is a need for satisfactory handling means, or mechanism, for placement and removal of the mandrel segments relative to the central post or spindle described in that application.

The present invention satisfies this need by providing a handling tool operable with a segmented mandrel that is specially modified for cooperative use with the tool. The mandrel essentially consists of a plurality of flexible, laminar segments arranged on a hollow, slotted, central spindle; and, in its preferred aspect, the tool, or mechanism, is a shaft or rod-like body, insertible into the spindle and having a controllable pawl capable of engaging the segments of the mandrel through the slot in the spindle. In another of its aspects the pawl is pivotally mounted in a bifurcated end of the shaft and operated by a rod or cable, as described in the above-indentified parent application of which this is a continuation-in-part.

An object of the invention is to provide a compact, easily-operable, reliable means for placement and removal of mandrel segments relative to the spindle thereof after it has been installed in a body to be molded.

Another object of the invention is to provide such a means that is automatically selective to engage only the aftmost mandrel segment.

Other objects and advantages of the invention may become apparent as it is disclosed in the following description and accompanying drawings, wherein the same parts are designated with identical characters throughout the disclosure.

Figure 1:
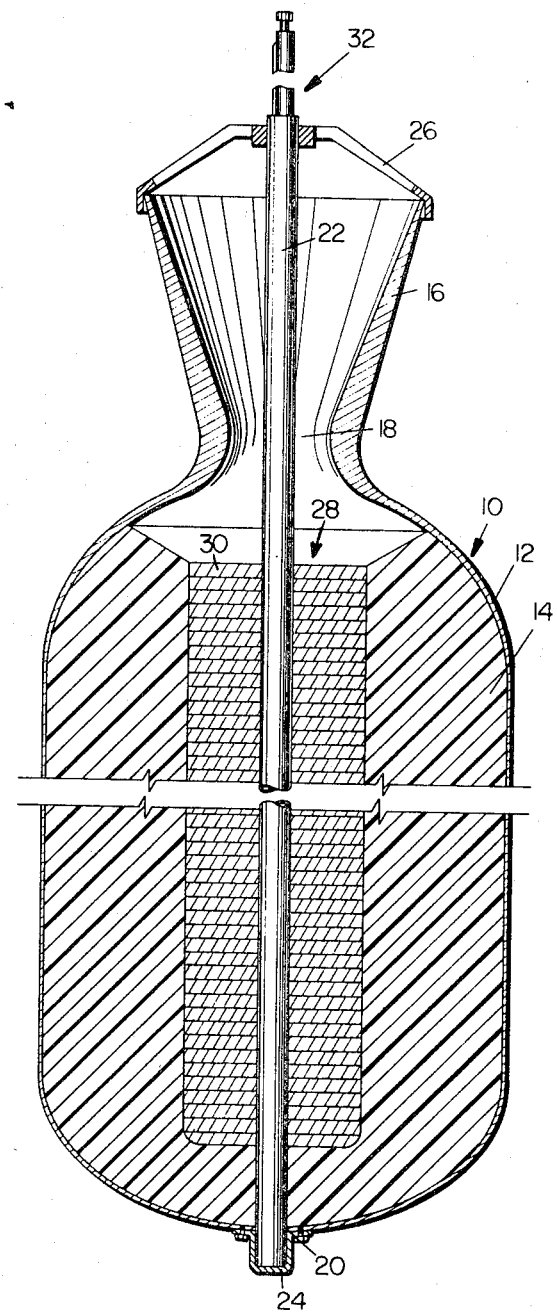
FIGURE 1 is a longitudinal section of a typical, solid propellant rocket with the invention installed.
Figure 3:
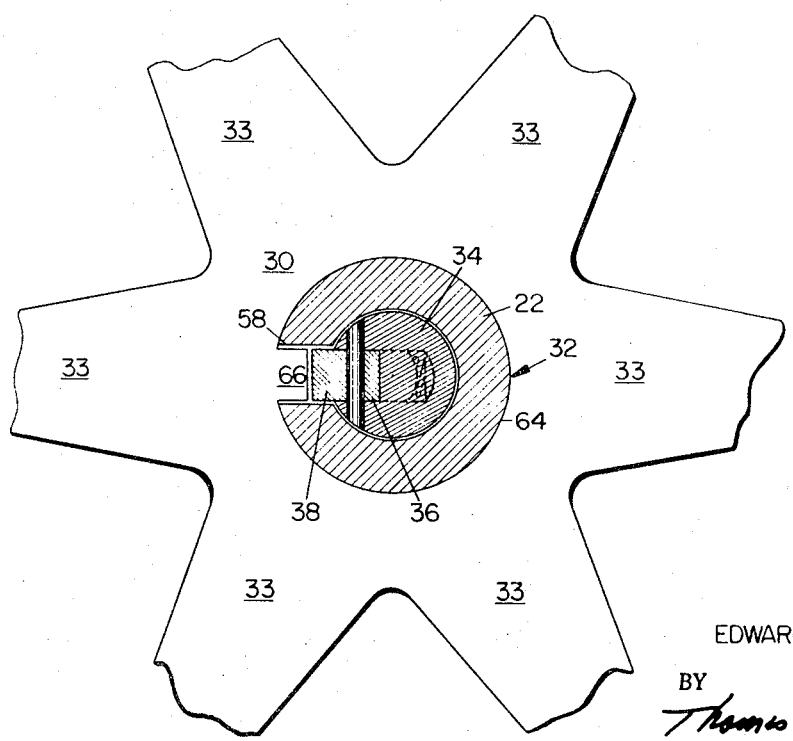
FIGURE 3 is a full section taken on the line 3—3 of FIGURE 2.

FIGURE 1 illustrates a typical rocket motor 10 having a case 12, a propellant grain 14, a nozzle 16, a nozzle throat 18, and a forward port 20 for installation of an igniter. A hollow spindle 22, which can be circular in cross section or in the form of a channel, is both supported and centered in the rocket motor 10 at the forward end by a retaining piece 24 and at the aft end by a spider support 26. The retaining piece 24 is fastened by screws to the igniter port 20 and the spider support 26 rests on and is secured to the nozzle 16. A mandrel 28 having a star-shaped, cross-sectional configuration is formed by a plurality of laminar segments 30 having flexible star points 33 (see FIGURE 3) so that the segments 30 may be moved individually through the throat 18, which constitutes an access opening smaller than the diameter of the mandrel 28. A handling tool 32 is inserted into the hollow spindle 22 for moving the mandrel segments 30 thereon.

Figure 2:
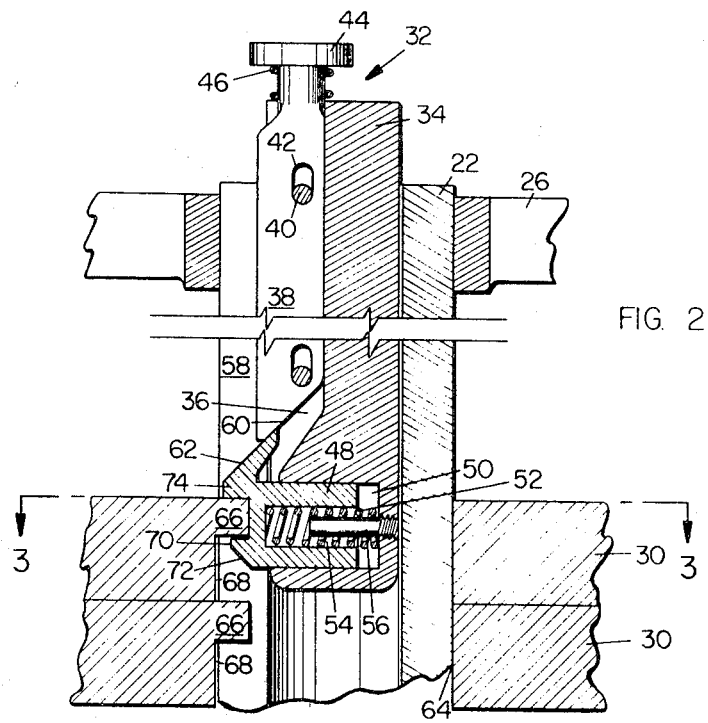
FIGURE 2 is a fragmentary, longitudinal section of a preferred form of the invention.

The tool 32 in the preferred embodiment best shown in FIGURE 2, includes a long, preferably round, shaft 34 having a longitudinal groove 36 in which a long, rectangular rod 38 is seated and retained by pins 40 in slotted holes 42 for longitudinal movement in parallel relationship to the shaft 34. The aft end of the rod 38 has a handle 44, spring loaded by a compression spring 46, to bias the rod 38 in an aft position relative to the shaft 34. A pawl 48, rectangular in cross-section and seated in a recess 50, is biased outwardly from the tool 32 by a compression spring 52. The spring 52 bears at one end against the surface of a recess 50 in the shaft 34 and at the other end against the surface of a recess 54 in the pawl 48, and it is retained in a central position by a guide 56. The hollow spindle 22 has a longitudinal slot 58 into which the rod 38 partially projects as a means of orienting the tool 32 therein and into which the pawl 48 extends for engagement of the segments 30. A first cam surface 60 at the forward end of the rod 38 engages a cam follower 62 fixed to the pawl 48 so that forward longitudinal motion of the rod 38 may cause the pawl 48 to move inwardly of the tool 32. Each mandrel segment 30 has a hole 64 through which the spindle 22 may pass and a tongue 66 extending into the slot 58 as a means of angular orientation of the mandrel segment 30 on the spindle 22. The thickness of each tongue 66 is less than that of its respective mandrel segment 30, to provide a recess 68 on the forward side thereof that is contiguous with the hole 64. A first projection 70 on the forward side of the pawl 48 has a second cam surface 72 that, when in contact with the aft edge of a hole 64 will cause the pawl 48 to be moved inwardly of the tool 32 on continued forward motion of the tool 32 in the spindle 22. In this manner, the projection 70 will slide over the tongue 66 until it clears the forward edge thereof, whereupon the projection 70 will be forced into the recess 68 by the spring 52. A second projection 74 on the aft side of the pawl 48 is sufficiently long that it cannot clear the tongue 66, so that the pawl 48 is selectively engageable exclusively to the aftmost segment 30 on the spindle 22. Since the tongue 66 may be confined in this manner between the first and second projections 70 and 74, it is apparent that the respective mandrel segment 30 may be moved along the spindle 22 in either direction by movement of the tool 32 therein.

Figure 4:
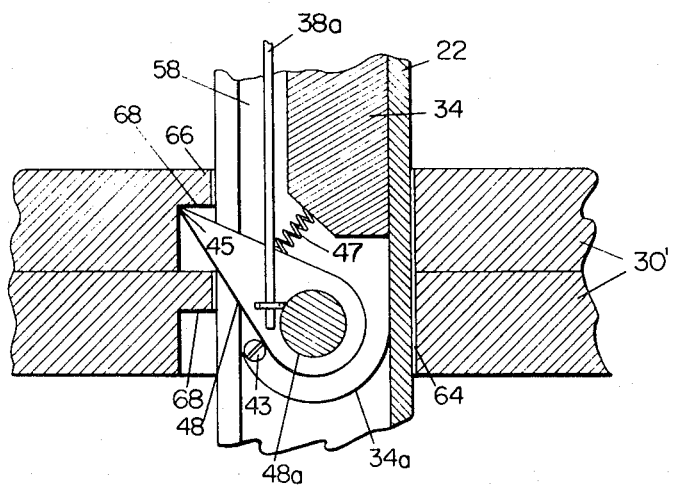
FIGURE 4 is a view, similar to FIGURE 2, of another form of the invention.

The second embodiment, as seen best in FIGURE 4, shaft 34 in the forward end 34a is bifurcated. Pawl 48 is pivotally mounted in bifurcated end 34a and has a projection 45, which is urged laterally into and through slot 58 in spindle 22 by means of resilient spring 47 positioned at the end of shaft 34 in the bifurcated end 34a thereof. Lateral movement of pawl 48 projection 45 is limited by the vertical wall of recess 68 in segment 30 and a stop 43 in end 34a. Longitudinally disposed acturating rod (or cable) 38a contacts pawl 48 and is attached thereto by bolts or other fastening means well known to the art, and extends vertically to the exterior of spindle 22 for operation in handling, installing and removing segments 30 from mandrel 28.

An invention has been described that represents an advance in the art of handling segmented mandrels of a specific type. Although a preferred and one additional embodiment thereof has been described with considerable specificity with regard to detail, it is understood that such details may be varied without departing from the scope of the invention as defined in the following claims.

What is claimed is:

1. A tool for handling segments of a mandrel assemblable on a hollow central spindle having a longitudinal slot therein, said segments each having a central hole through which said spindle may pass and a recees in the forward surface contiguous with said hole, comprising:
    a shaft in said spindle;
    a movable rod in said spindle longitudinally disposed therein and vertically extendible to the exterior of said spindle;
    a laterally extendible pawl attached to said shaft in said spindle, said pawl having a first projection for engaging said recess in at least one of said segments, means on said pawl for operatively contacting said rod whereby a longitudinal motion of said rod causes a corresponding lateral motion of said pawl projection; and
    resilient means positioned between said shaft and said pawl in a laterally biasing relationship of said pawl with respect to said shaft.

2. The tool of claim 1 wherein said rod has a cam surface at one end and said pawl has a cam follower in contact with said rod cam surface, said cam follower responsive to forward, longitudinal motion of said rod by a lateral movement out of said segment recess.

3. The tool of claim 1 wherein said shaft forward end is bifurcated, said pawl is pivotally mounted therein, and said rod is fastened to said pawl for pivotal actuation thereof, said pivotal actuation causing a lateral motion of said pawl projection into said recess of said segment.

4. A mechanism for assembling segments of a mandrel on a hollow central spindle having a longitudinal slot, said segments each having a central hole through which said spindle passes and a recess in the forward surface contiguous with said hole, comprising a shaft insertable in said spindle, a bifurcated end on said shaft, a pivotable pawl in said bifurcated end in engagement with said segments through said spindle slot means fixed to said bifurcated end for limiting the pivotal movement of said pawl, a spring positioned in said bifurcated end contacting said pawl urging said pawl outwardly into said recess of said segment, and an extensible rod means attached to said pawl for raising and lowering said segments on said spindle.

5. The tool of claim 1 further including a second projection on said pawl spaced aft of said first projection so that the portion of said mandrel segment between said recess and the aft surface thereof may be confined between said projections whereby said mandrel segment may be moved along said spindle.

6. The tool of claim 2 wherein said second projection is sufficiently long that it cannot be moved inwardly of said tool far enough to clear the edges of said holes in said segments, whereby only the aftmost of said segments can be engaged by said pawl.

7. A combined segmented mandrel for molding cavities of hollow bodies and handling tool for the segments thereof comprising:
    a hollow spindle having a longitudinal slot therein;
    a plurality of flexible, laminar segments, each having a hole through which said spindle may pass and a recess in the forward surface contiguous said hole; and
    a handling tool insertible into said spindle for sliding movement therein comprising a shaft; a rod engaged in parallel relationship to said shaft for longitudinal movement thereof and having a first cam surface on one end; a pawl attached to said shaft for motion perpendicular thereto, said pawl having a first projection thereon for engaging said recess of one of said segments, a cam follower on said pawl responsive to said first cam surface so that longitudinal motion of said rod may withdraw said pawl from said recess, and a second cam surface on the forward side of said pawl which, when in contact with the aft edge of said hole in one of said segments, will cause said pawl to be forced inwardly of said tool on continued forward movement thereof in said spindle, and resilient means bearing against said shaft and said pawl to bias said pawl outwardly from said tool.

8. The combination of claim 7 further including a second projection on said pawl spaced aft of said first projection so that the portion of a said mandrel segment between said recess and the aft surface thereof may be confined between said projections, whereby said mandrel segment may be moved along said spindle.

9. The combination of claim 8 wherein said second projection is sufficiently long that it can not be moved inwardly of said tool far enough to clear said edges of said holes in said segments, whereby only the aftmost of said segments can be engaged by said pawl.

10. The combination of claim 7 wherein said rod projects into said slot of said spindle for orienting said tool therein; and each of said mandrel segments has a short tongue extending into said slot for orienting said segment on said spindle, the thickness of said tongue being less than that of said segment to provide said recess on the forward side thereof.

References Cited

UNITED STATES PATENTS 3,083,409  4/1963  Crawford et al.
3,345,693  10/1967  McCullough.

J. HOWARD FLINT, JR., Primary Examiner

U.S. Cl. X.R.

29—200